Feb. 28, 1933.    A. W. MACHLET    1,899,764
GAS MEASURING DEVICE
Filed Dec. 2, 1929
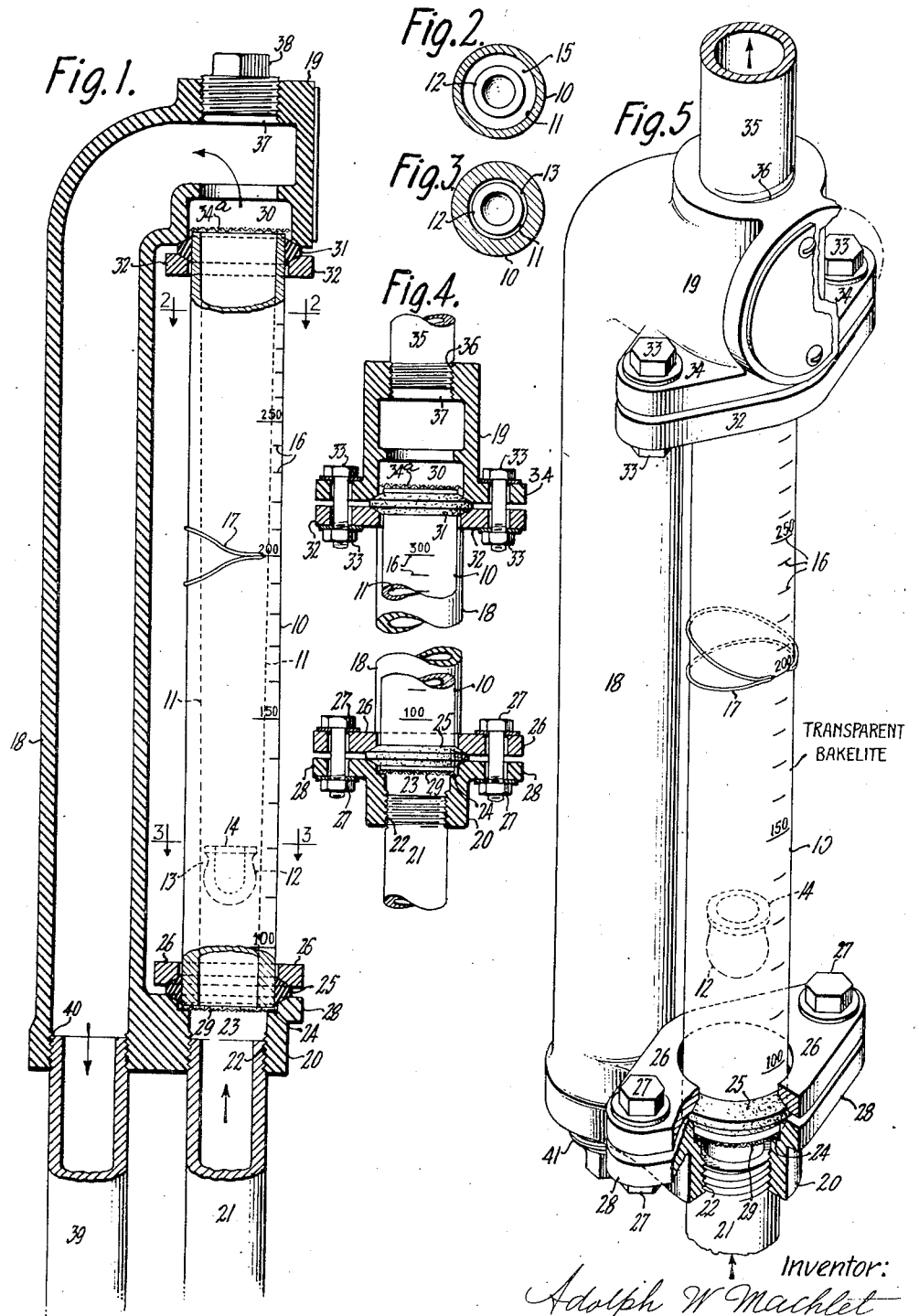
Inventor:
Adolph W Machlet
by BC Hickney
Attorney.

Patented Feb. 28, 1933

1,899,764

UNITED STATES PATENT OFFICE

ADOLPH W. MACHLET, OF ELIZABETH, NEW JERSEY

GAS-MEASURING DEVICE

Application filed December 2, 1929. Serial No. 410,956.

This invention is in the nature of an improvement in means for determining the rate of flow of gas or fluid.

The fluid is made to flow through an upright tube having its interior slightly tapered from its top to its bottom, and a flow-measuring float is placed within the tube and kept suspended by the flow of gas up through the tube. As the flow of gas lessens, the float drops. As the flow increases, the float rises. The higher the float, the greater the area of the annular gas passage which surrounds the same, and the greater the flow of gas.

The tube is carefully made and the tapered bore is very accurate.

A feature of the invention is to avoid troubles from the bores being different in different tubes of the same batch, making it impossible to duplicate the tubes mechanically in mass production. Such variation would make it necessary to provide different scale-markings upon each individual tube, after first testing the rate of flow of gas through that one tube.

It is a feature of the invention that the measuring tubes can be manufactured in large quantities, each one exactly like all the others in every respect, both as to diameter and as to bore-tapering, and also as to scale-markings, the reading of every tube being mechanically rendered accurate, and the cost of manufacture being very low.

It is a feature of the invention to make the tube of mechanically-shaped plastic material which is a compound of phenol and formaldehyde, or a phenolic condensation product. This plastic material may be sufficiently clear to enable the interior float to be observable therethrough. Being of plastic material or molded, it is easily formable by mechanical molding means, and is also workable by ordinary cutting tools, and the bore can be mechanically duplicated of exactly the right taper, in any quantity desired.

It is further an advantage that the tube is not liable to become broken in finishing the bore, and in marking the scale, or in handling it in the factory, nor is it liable to become broken by transportation or in use.

Other features and advantages will hereinafter appear.

In the accompanying drawing,

Figure 1 is a side elevation of a preferred form of gage for metering the flow of gas, according to the present invention.

Figure 2 is a sectional view of the meter taken at the line 2—2 of Figure 1.

Figure 3 is a sectional view of the meter taken at about the line 3—3 of Figure 1. Figures 2 and 3 may be taken together to indicate the tapering of the bore of the gage-tube through which the gas flows up, the large end of the taper being at the top.

Figure 4 is a sectional front view of the meter.

Figure 5 is a perspective view of the meter with portions broken away.

The gas (under pressure), whose rate of flow is to be measured, passes up through a long gage tube 10, which is provided with a tapering bore 11, the taper being smallest at the bottom and largest at the top. In this bore is inserted a movable flow-indicator in the form of a float 12, of such size that it nearly fills the tapering bore at the bottom, leaving but a small annular gas passage 13, so that at this time it is evident that there will be only a minimum flow of gas. The float may be in the form of a cup, and its top edge 14 may serve as an index, which, at the bottom position of the float, will register with a graduation, which may be marked 100, upon the measuring tube, this indicating the minimum flow of the gas.

If by reason of increased consumption, or increased pressure, or other cause, the current flows so fast as to lift the float or indicator 12, it will be understood that the higher the point to which the float rises the greater becomes the capacity of the annular passage between the float and the inner wall of the tube 10; a large passage being indicated at 15, Figure 2, as being formed by the float when at the top portion of the tube. The float comes to rest at some elevation, viz., the point where the annular passage around the float is sufficient to permit the increased flow of gas at a pressure which maintains the float at such elevation. Therefore by observing the graduation 16 on the tube, and noting where the top edge 14 of the floating stands in respect to said graduation, the operator is enabled to determine the rate of flow.

A C-shaped spring-index 17 may clasp the tube, and will maintain itself thereon at any position to which it is slidden up or down the tube, and is of assistance in enabling the operator to maintain a steady flow when desired, or in warning him that the rate is too high or too low.

The gage-tube 10 is made of such clear consistency that the float therein can be observed through the wall of the tube. This is inexpensive material, and one of the advantages of the invention is that the tapered bore can be machine-finished to the exact required dimensions. This finishing can be done by tools, or, if desired, by preparing an exact mold upon which the tube is originally molded or formed when in fluent or plastic condition. In any case an exact and uniform degree of tapering is insured by mechanical means throughout the length of the tube, so that the instrument affords exactness of measurement of the flow of the gas.

Moreover the expense of manufacturing a quantity of tubes is relatively small, because they can be made up all exactly alike, and the graduations can be made the same on all the tubes in the lot.

Moreover the tubes can be made with either large or small bores, and either much or little taper, according to the work for which they are intended. If the measurement of the flow of gas is desired to be very exact, then the tapering of the bore is made very slight, so that it is only a little larger at the top than it is at the bottom, and hence the float would have to rise a great distance, in proportion, to permit a given increase in the rate of flow of gas. and this great rise affords means for accurately measuring the rate of flow. If on the other hand accuracy of reading is not desired, then the tapering can be made much greater, with the bore at the top of the tube much larger than the bore at the bottom of the tube, so that a little rise of the float may much enlarge the annular passage for the gas. and such a tube will have a great range or capacity of measurement.

It will be seen that as many varieties of tubes as desired can be made, and that all the same variety will be exactly alike, and all made at very little cost. Tubes can be made from zero to fifty cubic feet capacity, or from fifty to one or two hundred, and even up to five-hundred or one-thousand cubic-feet capacity.

The tubes do not have to be individually graduated, but the same graduation may apply to all of the tubes in any quantity that is manufactured, all having the same bore; and, as explained, tubes can be manufactured with the same bore in indefinite quantities, and all exact duplicates. The described plastic tube can be formed and manufactured on an equal footing with a metal tube, in respect to accuracy of manufacture and inexpensiveness, reliability and duplication. The tubes can be duplicated in any quantity.

The float is preferably in the form of a cup, having a spherical body and a mouth which is turned out to form an annular brim which serves as the gage or index to co-operate with the scale which is provided upon the outside of the transparent measuring tube 10.

The tube does not break easily. This is of importance, because of the liability of great and sudden variations in the temperature of the gas whose flow is being measured. Temperature changes do not affect the tube, so it is not liable to break or crack.

For convenience in inserting the tube 10 into a system through which the gas is intended to flow, it is mounted in a strong metal frame, which may consist of a casting, and the main member of which may be a column 18 of cast-iron or brass, which stands alongside of the tube 10, and has at its top a hollow head 19 to receive the upper end of tube 10, and at its bottom a hollow foot 20 to receive the lower end of tube 10.

A supply-pipe 21 from the source of gas is threaded up at 22 into a passage 23 in the foot 20 of the frame; and the tube 10 is set down upon a conical seat 24 formed at the top of said passage. A soft rubber gasket 25 of double-cone form is held down by a keeper 26 having a conical seat and which is secured by screws 27 to a shelf 28 projecting from the foot 20. The gasket 25 makes a gas-tight joint; and a screen 29 may be placed upon the seat 24 for the bottom of the tube 10 to rest upon. The screen serves as a strainer to prevent clogging in the tube 10.

A corresponding arrangement is made in the head 19 of the frame, which has a passage 30 into which the top of the tube 10 opens, the tube being inserted loosely in said passage, and a rubber double-cone gasket 31 being packed around the tube by means of a keeper 32 having a conical seat attached by bolts and nuts 33 to a shelf 34 formed upon said head 19; a screen 34ª (similar to 29) preferably surmounting the tube. The gas may flow out of the top (Figure 5), and up through a delivery pipe 35, which may be threaded at 36 into an opening 37 provided in the top of the head 19. At Figure 5 the gas may come up from the inlet and pass up through the tube 10 and through the outlet 35 and up to the point of delivery.

The frame, however, is preferably made with a return, for the purpose of directing the delivery of gas downwardly when desired. When using the return, the top hole 37 in the head 19 is closed up by a plug 38 and the gas flows downwards through the column 18, which is hollow, and is in open communication with the hollow head 19, and down through an outlet pipe 39, which is threaded at 40 up into the bottom of the hollow column 18.

It will be seen at Figure 5, however, that the outlet passage 40 in the bottom of the hollow column may be closed by a plug 41, since no flow passes through said hollow column at Figure 5.

In some cases other plastic machineable translucent measuring tubes may be used, whether vulcanized or not; such as celluloid, or shellac, or resinous material, for example.

Variations may be resorted to within the scope of the invention, and portions of the improvements may be used without others.

Having thus described my invention, I claim:

1. A flow meter comprising a metal column with upper and lower offsets having aligned openings entirely through said offsets and having conical seats adjacent the openings, a transparent tube that may be machine bored and having its internal surface accurately machine bored to a conical shape, a float in the tube smaller in its largest diameter than the smallest internal diameter of said tube, said tube being graduated and disposed in said openings, conical gaskets surrounding the tube at both ends and resting against the side of the openings in said offsets, heads having conical seats for compressing said gaskets against the tube sides and said conical seats in the offsets and means for securing said heads to said offsets, said openings in the lower and upper offsets serving as inlet and outlet openings respectively.

2. The process of making one piece flow-meter tubes having conical bores comprising providing molded transparent tubes having a generally conical bore and of a material that may be readily machine cut, then machine cutting the interior of each tube to provide a conical bore corresponding to the degree of precision of a selected standard tube, and graduating the tubes precisely alike corresponding to such standard tube.

ADOLPH W. MACHLET.